US012412469B2

(12) United States Patent
Yamada et al.

(10) Patent No.: US 12,412,469 B2
(45) Date of Patent: Sep. 9, 2025

(54) INFORMATION PROCESSING METHOD, INFORMATION PROCESSING DEVICE, AND PROGRAM

(71) Applicant: MITSUBISHI HEAVY INDUSTRIES, LTD., Tokyo (JP)

(72) Inventors: Masahiro Yamada, Tokyo (JP); Yohei Chishiki, Tokyo (JP); Kenji Takao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 279 days.

(21) Appl. No.: 18/125,393

(22) Filed: Mar. 23, 2023

(65) Prior Publication Data

US 2023/0306839 A1    Sep. 28, 2023

(30) Foreign Application Priority Data

Mar. 24, 2022 (JP) ................... 2022-049044

(51) Int. Cl.
 *G08G 1/017* (2006.01)
 *G08G 1/056* (2006.01)
 *G08G 1/065* (2006.01)

(52) U.S. Cl.
 CPC ............. *G08G 1/017* (2013.01); *G08G 1/056* (2013.01); *G08G 1/065* (2013.01)

(58) Field of Classification Search
 CPC ........ G08G 1/017; G08G 1/056; G08G 1/065; G08G 1/066; G08G 1/166

(Continued)

(56) References Cited

U.S. PATENT DOCUMENTS 8,751,060 B2   6/2014 Kinoshita
10,467,505 B2 * 11/2019 Ishii ................. G06F 18/25
(Continued)

FOREIGN PATENT DOCUMENTS

CN    111164381 A  *  5/2020  ............. G06T 19/00
EP      3776514 B1 *  6/2022  ............. G08G 1/166
(Continued)

OTHER PUBLICATIONS

Extended European Search Report for European Application No. 23163409.8, dated Jun. 5, 2023.
(Continued)

*Primary Examiner* — Atul Trivedi
(74) *Attorney, Agent, or Firm* — Birch, Stewart, Kolasch & Birch, LLP

(57) ABSTRACT

An information processing method includes a step of acquiring movement information on a first mobile body including information on a first position through which the first mobile body is scheduled to pass in a first time slot and information on a travel direction of the first mobile body and a step of setting, as an exclusive area in the first time slot, an area between the first position and a second position on a travel direction side of the first mobile body from the first position based on the movement information on the first mobile body. The exclusive area is set in a manner that the second mobile body other than the first mobile body is not permitted to move within the exclusive area in the travel direction different from the travel direction of the first mobile body in the first time slot, and the second mobile body is permitted to move within the exclusive area in the same travel direction as the first mobile body in the first time slot.

7 Claims, 15 Drawing Sheets

(58) Field of Classification Search
USPC .......................................................... 701/117
See application file for complete search history.

(56) References Cited

U.S. PATENT DOCUMENTS

| | | | |
|---|---|---|---|
| 11,074,447 | B1 * | 7/2021 | Fox ........................... G08G 5/55 |
| 2007/0294029 | A1 | 12/2007 | D'Andrea et al. |
| 2011/0106341 | A1 | 5/2011 | Kinoshita |
| 2018/0082155 | A1 * | 3/2018 | Ishii ........................ G06F 18/25 |
| 2018/0097991 | A1 * | 4/2018 | Hachimura ............ H04N 23/64 |
| 2019/0072965 | A1 * | 3/2019 | Zhang .................... G08G 1/166 |
| 2019/0072966 | A1 * | 3/2019 | Zhang .................... G05D 1/646 |
| 2019/0286093 | A1 * | 9/2019 | Taira ....................... G06F 3/017 |
| 2020/0233435 | A1 | 7/2020 | Kichkaylo |
| 2020/0307576 | A1 * | 10/2020 | Takegawa .............. B60K 35/28 |
| 2021/0021960 | A1 * | 1/2021 | Kobayashi ............ G01S 5/0027 |
| 2021/0192709 | A1 * | 6/2021 | Sibley .................... G06V 20/13 |
| 2021/0192754 | A1 * | 6/2021 | Sibley .................... G06N 20/00 |
| 2021/0271257 | A1 * | 9/2021 | Watanabe ............... G06F 18/24 |
| 2021/0272018 | A1 * | 9/2021 | Casas ........................ G06N 7/01 |
| 2021/0312476 | A1 * | 10/2021 | Kita ....................... G06Q 30/06 |
| 2021/0389769 | A1 * | 12/2021 | Hari ...................... G05B 13/027 |
| 2022/0057812 | A1 | 2/2022 | Ai et al. |
| 2022/0144260 | A1 * | 5/2022 | Chen ................. B60W 30/0956 |
| 2022/0319318 | A1 * | 10/2022 | Takehara ............... B60W 40/04 |
| 2023/0082350 | A1 * | 3/2023 | Endo ..................... G06V 20/588 |
| | | | 701/41 |
| 2023/0104951 | A1 * | 4/2023 | Wakabayashi ........ B60W 40/04 |
| | | | 701/41 |
| 2023/0324194 | A1 * | 10/2023 | Akbarzadeh ....... G01C 21/3415 |
| | | | 701/117 |
| 2023/0358560 | A1 * | 11/2023 | Kanazawa .......... G01C 21/3815 |

FOREIGN PATENT DOCUMENTS

| | | | | |
|---|---|---|---|---|
| EP | 4012338 | A1 * | 6/2022 | ......... G01C 21/3415 |
| JP | 61-262903 | A | 11/1986 | |
| JP | 2011-227716 | A | 11/2011 | |
| JP | 5029622 | B2 | 9/2012 | |
| JP | 2021124927 | A * | 8/2021 | |
| JP | 2021170165 | A * | 10/2021 | ........... G06V 20/584 |
| KR | 10-2010-0139134 | A | 12/2010 | |
| WO | WO-2017208619 | A1 * | 12/2017 | ............... G06T 7/20 |
| WO | WO-2019187662 | A1 * | 10/2019 | ........... H04W 4/029 |

OTHER PUBLICATIONS

Japanese Office Action for Japanese Application No. 2022-049044, dated Jan. 30, 2024, with English translation.

* cited by examiner

| PRIORITY INFORMATION | TARGET OBJECT INFORMATION | FIRST POSITION | SECOND POSITION |
|---|---|---|---|
| 0001 | P1 | A1 | A2 |
| 0002 | P11 | A11 | A3 |
| 0003 | P21 | A21 | A4 |
| 0004 | P2 | A31 | A5 |
| 0005 | P21 | A41 | A6 |

FIG. 6

| PRIORITY INFORMATION | TARGET OBJECT INFORMATION | FIRST POSITION | SECOND POSITION | MOBILE BODY | WAYPOINT |
|---|---|---|---|---|---|
| 0001 | P1 | A1 | A2 | 10A | ···,A1,··· |
| 0002 | P11 | A11 | A3 | 10B | ···,A11,··· |
| 0003 | P21 | A21 | A4 | 10C | ···,A21,··· |
| 0004 | P2 | A31 | A5 | 10A | ···,A31,··· |
| 0005 | P21 | A41 | A6 | 10B | ···,A41,··· |

FIG. 7

INFORMATION PROCESSING METHOD, INFORMATION PROCESSING DEVICE, AND PROGRAM

CROSS-REFERENCE TO RELATED APPLICATIONS

This application claims the benefit of priority to Japanese Patent Application Number 2022-049044 filed on Mar. 24, 2022. The entire contents of the above-identified application are hereby incorporated by reference.

TECHNICAL FIELD

The disclosure relates to an information processing method, an information processing device, and a program.

RELATED ART

A known technique for a plurality of mobile bodies that automatically move is to reserve an area where a mobile body is scheduled to move as an exclusive area (blocking area) and prevent another mobile body from entering the exclusive area. For example, JP 5029622 B describes determining, in attempting to reserve a first blocking area for a vehicle, whether a deadlock occurs when another vehicle passes through a second blocking area corresponding to the first blocking area. In JP 5029622 B, when it is determined that no deadlock occurs, the first blocking area can be reserved.

SUMMARY

However, there is room for improvement in suppressing a deadlock.

The disclosure has been made to solve the above-described problem, and an object of the disclosure is to provide an information processing method, an information processing device, and a program that can suppress a deadlock.

An information processing method according to the disclosure includes a step of acquiring movement information on a first mobile body including information on a first position through which the first mobile body is scheduled to pass in a first time slot and information on a travel direction of the first mobile body and a step of setting, as an exclusive area in the first time slot, an area between the first position and a second position on a travel direction side of the first mobile body from the first position based on the movement information on the first mobile body. The exclusive area is set in a manner that a second mobile body other than the first mobile body is not permitted to move within the exclusive area in a travel direction different from the travel direction of the first mobile body in the first time slot and that the second mobile body is permitted to move within the exclusive area in a travel direction identical to the travel direction of the first mobile body in the first time slot.

An information processing device according to the disclosure includes a movement information acquisition unit configured to acquire movement information on a first mobile body including information on a first position through which the first mobile body is scheduled to pass in a first time slot and information on a travel direction of the first mobile body and a work setting unit configured to set, as an exclusive area in the first time slot, an area between the first position and a second position on a travel direction side of the first mobile body from the first position based on the movement information on the first mobile body. The exclusive area is set in a manner that a second mobile body other than the first mobile body is not permitted to move within the exclusive area in a travel direction different from the travel direction of the first mobile body in the first time slot and that the second mobile body is permitted to move within the exclusive area in a travel direction identical to the travel direction of the first mobile body in the first time slot.

A program according to the disclosure causes a computer to execute a step of acquiring movement information on a first mobile body including information on a first position through which the first mobile body is scheduled to pass in a first time slot and information on a travel direction of the first mobile body and a step of setting, as an exclusive area in the first time slot, an area between the first position and a second position on a travel direction side of the first mobile body from the first position based on the movement information on the first mobile body. The exclusive area is set in a manner that a second mobile body other than the first mobile body is not permitted to move within the exclusive area in a travel direction different from the travel direction of the first mobile body in the first time slot and that the second mobile body is permitted to move within the exclusive area in a travel direction identical to the travel direction of the first mobile body in the first time slot.

The disclosure can suppress a deadlock.

BRIEF DESCRIPTION OF DRAWINGS

The disclosure will be described with reference to the accompanying drawings, wherein like numbers reference like elements.

FIG. 6 is a table showing an example of movement destination information.

FIG. 7 is a table for explaining the setting of a work.

DESCRIPTION OF EMBODIMENTS

Hereinafter, preferred embodiments of the disclosure will be described in detail with reference to the accompanying drawings. Note that the disclosure is not limited to these embodiments, and when there are a plurality of embodiments, the disclosure is intended to include a configuration combining these embodiments.

First Embodiment

Movement Control System

Figure 1:
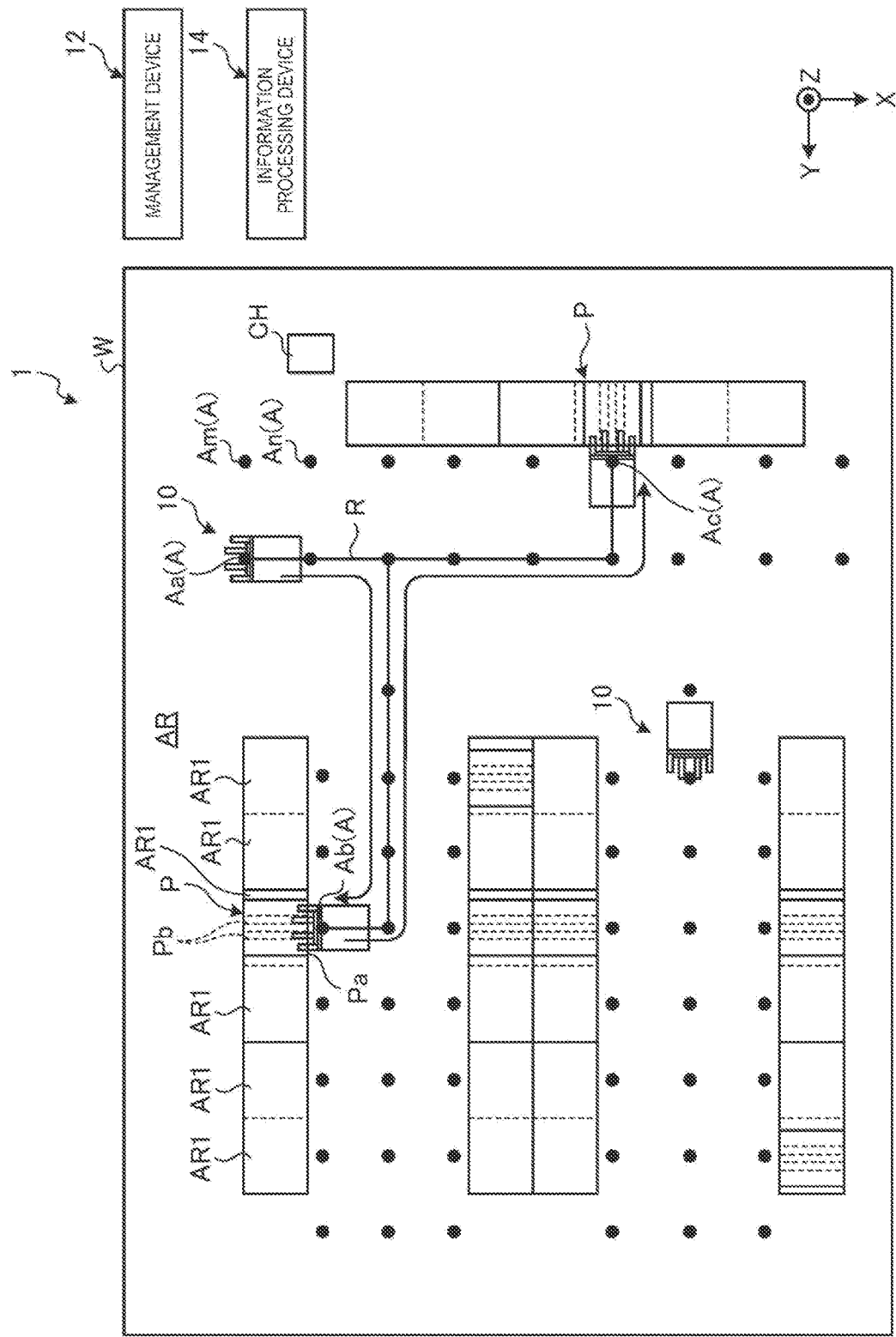
FIG. 1 is a schematic view of a movement control system according to the present embodiment.

FIG. 1 is a schematic view of a movement control system according to the present embodiment. As illustrated in FIG. 1, a movement control system 1 according to the present embodiment includes a mobile body 10, a management device 12, and an information processing device 14. The movement control system 1 is a system that controls the movement of the mobile body 10 belonging to a facility W. The facility W is a facility, such as a warehouse, that is logistically managed. The movement control system 1 causes the mobile body 10 to pick up and convey a target object P disposed within an area AR in the facility W. The area AR is, for example, a floor surface of the facility W, and is an area in which the target object P is placed and through which the mobile body 10 moves. In the present embodiment, the target object P is a conveyance target object composed of a pallet and a burden loaded on the pallet. The target object P includes an opening Pb into which a fork 24 of the mobile body 10 to be described later is inserted, and the opening Pb is formed in a front surface Pa of the target object P. However, the target object P is not limited to an object composed of a pallet and a burden loaded on the pallet, and may be only a burden without a pallet, for example.

Hereinafter, an operation including movement along a route R (to be described later) by the mobile body 10 will be appropriately referred to as a work of the mobile body 10. Further, in the present embodiment, the mobile body 10 moves along the route R to load, convey, and unload the target object P, and thus a series of operations by the mobile body 10 to move along the route R, and load, convey, and unload the target object P can be said to be the work of the mobile body 10. Hereinafter, one direction along the area AR is referred to as an X direction, and a direction along the area AR that is orthogonal to the X direction is referred to as a Y direction. In the present embodiment, the Y direction is a direction orthogonal to the X direction. The X direction and the Y direction may be horizontal directions. A direction orthogonal to the X direction and the Y direction, more specifically, an upward direction in the vertical direction is referred to as a Z direction. In the present embodiment, unless otherwise specified, a "position" refers to a position (coordinates) in a coordinate system in a two dimensional plane on the area AR (the coordinate system of the area AR). Also, unless otherwise specified, an "orientation" of the mobile body 10 or the like refers to an orientation of the mobile body 10 in the coordinate system of the area AR, and means a yaw angle (rotation angle) of the mobile body 10 with the X direction defined as 0 degrees when viewed from the Z direction.

A plurality of placement areas AR1 is disposed in the area AR in the facility W. The placement areas AR1 are configured to be used as areas in which the target object P is placed. The target object P may be placed or may not be placed in each placement area AR1 depending on the situation of the facility W. The position (coordinates), the shape, and the size of the placement area AR1 are determined in advance. In the example illustrated in FIG. 1, the placement areas AR1 are set on a shelf provided in the area AR, but are not limited thereto, and may be provided on the area AR (i.e., on the floor of the facility W), or may be provided in a loading platform of a vehicle that has conveyed the target object P into the facility W. In addition, in the present embodiment, the placement area AR1 is defined for each target object P, and one target object P is placed in each placement area AR1, but the disclosure is not limited thereto. For example, the placement area AR1 may be set as a free space in which a plurality of target objects P are placed. In addition, in the example in FIG. 1, the placement area AR1 has a rectangular shape, but may have any shape and any size, and the number of the placement areas AR1 is also optional.

Waypoint

In the area AR, a waypoint A is set for each position (coordinates). The route R along which the mobile body 10 moves is configured to connect the waypoints A. That is, a route connecting the waypoints A through which the mobile body 10 is scheduled to pass is the route R of the mobile body 10. The waypoints A are set according to the layout of the facility W such as the positions of the placement areas AR1 and passages. For example, the waypoints A are set in a matrix form in the area AR, and the positions and the number of the waypoints A are set such that a route R connecting a position facing one placement area AR1 to a position facing any other placement area AR1 can be set. The position facing the placement area AR1 may be, for example, a position at which the mobile body 10 can pick up the target object P placed in the placement area AR1. In addition, the waypoints A include a waypoint A configured to be a charging point (in the example of FIG. 1, a waypoint An at which a charger CH is placed) or a waypoint A configured to be a waiting point (in the example of FIG. 1, a waypoint Am). The waypoint A that is a charging point or a waiting point may be set at any position that does not overlap a route (the route used for conveyance) connecting the waypoints A facing the respective placement areas AR1.

Mobile Body

Figure 2:
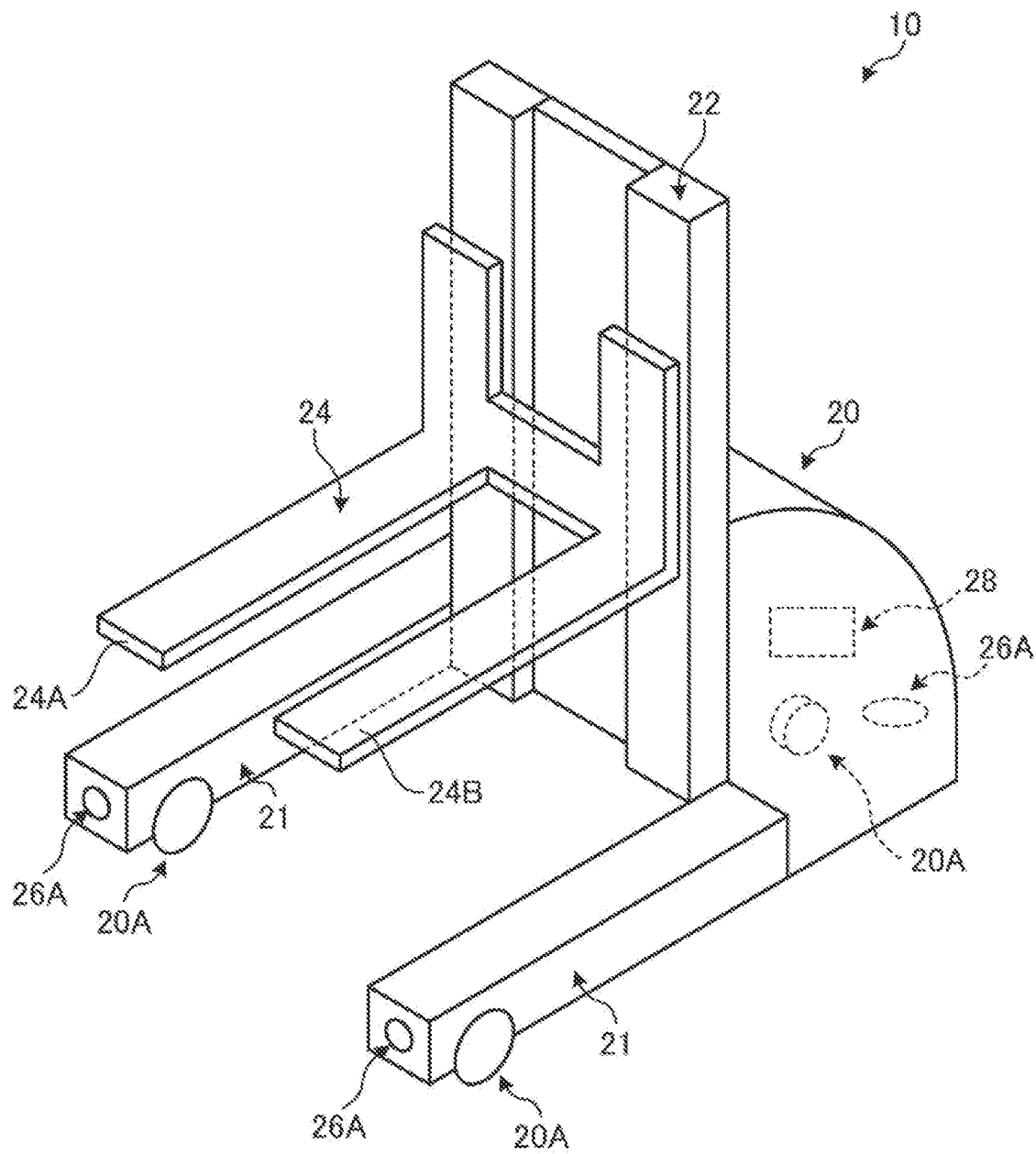
FIG. 2 is a schematic view of a configuration of a mobile body.

FIG. 2 is a schematic view of a configuration of a mobile body. The mobile body 10 is a device that can move automatically and convey the target object P. Further, in the present embodiment, the mobile body 10 is a forklift, and more specifically, a so-called automated guided vehicle (AGV) or a so-called automated guided forklift (AGF). However, the mobile body 10 is not limited to a forklift for conveying the target object P, and may be any device capable of moving automatically.

As illustrated in FIG. 2, the mobile body 10 includes a vehicle body 20, a wheel 20A, a straddle leg 21, a mast 22, a fork 24, a sensor 26A, and a control device 28. The straddle leg 21 is a shaft-like member that is disposed in pairs at one end portion of the vehicle body 20 in a front-back direction and protrudes from the vehicle body 20. The wheel 20A is disposed at a leading end of each of the straddle legs 21 and at the vehicle body 20. That is, a total of three wheels 20A are disposed, but the positions and the number of the wheels 20A disposed may be optional. The mast 22 is movably attached to the straddle legs 21 and moves in the front-back direction of the vehicle body 20. The mast 22 extends along the vertical direction (here, the direction Z) orthogonal to the front-back direction. The fork 24 is attached to the mast 22 so as to be movable in the direction Z. The fork 24 may be movable in a lateral direction of the vehicle body 20 (a direction intersecting with the vertical direction and the front-back direction) with respect to the mast 22. The fork 24 includes a pair of tines 24A and 24B. The tines 24A and 24B extend, from the mast 22, toward the front direction of the vehicle body 20. The tines 24A and 24B are arranged separated from each other in the lateral direction of the mast 22. In the front-back direction, a direction to a side of the mobile body 10 where the fork 24 is disposed and a direction to a side where the fork 24 is not disposed are referred to as a front direction and a back direction, respectively.

The sensors 26A detect at least one of the position and the orientation of a target object present in the periphery of the vehicle body 20. That is, it can be said that the sensor 26A detects at least one of the position of the target object relative to the mobile body 10 and the orientation of the target object relative to the mobile body 10. In the present embodiment, the sensor 26A is disposed at a leading end of each of the straddle legs 21 in the front direction, and at the vehicle body 20 on a back direction side. However, the positions at which the sensors 26A are disposed are not limited to these positions, the sensors 26A may be disposed at any positions, and the number of the sensors 26A disposed may be optional.

The sensor 26A is a sensor that emits a laser beam, for example. The sensor 26A emits the laser beam while performing scanning in one direction (here, the lateral direction), and detects the position and the orientation of the target object based on the reflected light of the laser beam emitted. That is, the sensor 26A is a so-called two-dimensional (2D) light detection and ranging (LiDAR) sensor. Note that the sensor 26A is not limited to the one described above, may be a sensor that detects the target object using any method, for example, may be a so-called three-dimensional (3D)-LiDAR sensor in which scanning is performed in multiple directions, may be a so-called one dimensional (1D)-LiDAR sensor in which no scanning is performed, or may be a camera.

The control device 28 controls the movement of the mobile body 10. The control device 28 will be described later.

Management Device

Figure 3:
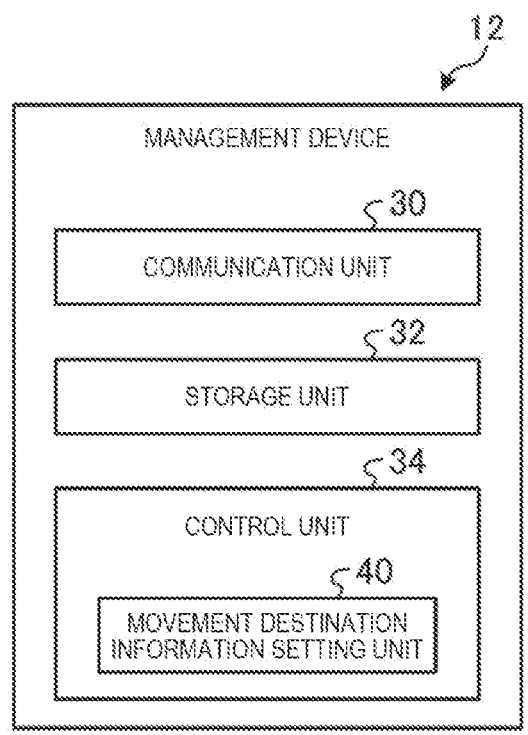
FIG. 3 is a schematic block diagram of a management device.

FIG. 3 is a schematic block diagram of a management device. The management device 12 is a system that manages physical distribution in the facility W. The management device 12 is a warehouse control system (WCS) or a warehouse management system (WMS) in the present embodiment, but is not limited to a WCS and a WMS, and may be any system including a backend system such as any other production management system. The management device 12 may be disposed at any position, and may be disposed in the facility W, or may be disposed at a separate position from the facility W so as to manage the facility W from the separate position. The management device 12 is a computer and includes a communication unit 30, a storage unit 32, and a control unit 34 as illustrated in FIG. 3.

The communication unit 30 is a module used by the control unit 34 to communicate with an external device such as the information processing device 14, and may include, for example, a Wi-Fi (registered trademark) module or an antenna. The communication method of the communication unit 30 is wireless communication in the present embodiment, but any communication method may be used. The storage unit 32 is a memory that stores various information such as computation contents of the control unit 34 and programs, and includes, for example, at least one of a primary storage device such as a random access memory (RAM) or a read only memory (ROM), and an external storage device such as a hard disk drive (HDD).

The control unit 34 is an arithmetic device and includes, for example, an arithmetic circuit such as a central processing unit (CPU). The control unit 34 includes a movement destination information setting unit 40. The control unit 34 reads a program (software) from the storage unit 32 and executes the program to implement the movement destination information setting unit 40 and perform the processing thereof. Note that the control unit 34 may execute such processing with a single CPU, or may include a plurality of CPUs and execute the processing with the plurality of CPUs. The movement destination information setting unit 40 may be implemented by a hardware circuit. The program for the control unit 34 stored in the storage unit 32 may be stored in a recording medium that is readable by the management device 12.

The movement destination information setting unit 40 sets movement destination information indicating a movement destination of the mobile body 10. The processing by the movement destination information setting unit 40 will be more specifically described later.

Note that the management device 12 may execute processing other than the setting of the movement destination information. For example, the management device 12 may also set information for controlling a mechanism other than the mobile body 10 disposed in the facility W (for example, an elevator and a door).

Information Processing Device

Figure 4:
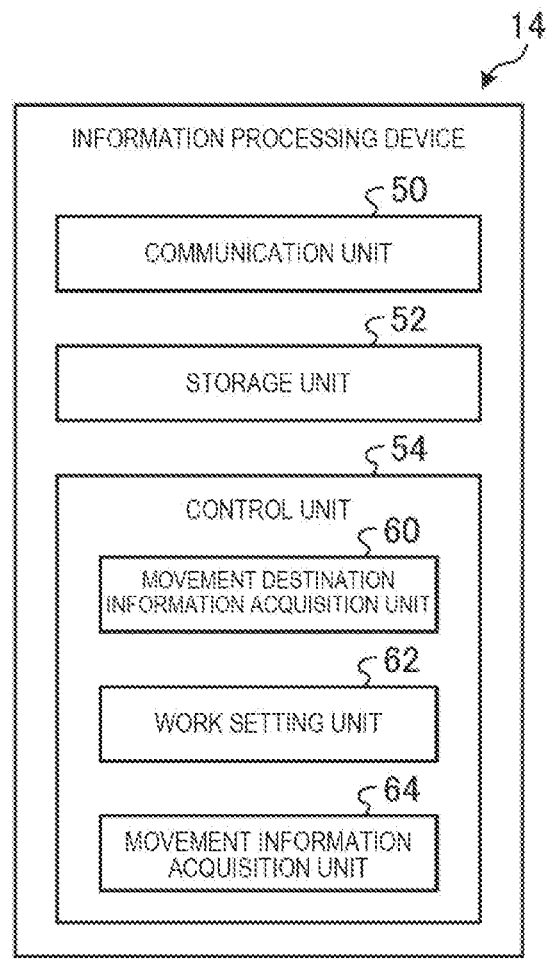
FIG. 4 is a schematic block diagram of an information processing device.

FIG. 4 is a schematic block diagram of the information processing device. The information processing device 14 is a device that is disposed in the facility W and processes information related to the movement of the mobile body 10. The information processing device 14 is, for example, a fleet control system (FCS), but is not limited thereto, and may be any device that processes information related to the movement of the mobile body 10. The information processing device 14 is a computer and includes a communication unit 50, a storage unit 52, and a control unit 54 as illustrated in FIG. 4. The communication unit 50 is a module used by the control unit 54 to communicate with an external device such as the management device 12 and the mobile body 10, and may include, for example, an antenna or a Wi-Fi module. The communication method of the communication unit 50 is wireless communication in the present embodiment, but any communication method may be used. The storage unit 52 is a memory for storing various information such as computation contents of the control unit 54 and programs, and includes, for example, at least one of a primary storage device such as a RAM or a ROM, and an external storage device such as an HDD.

The control unit 54 is an arithmetic device and includes an arithmetic circuit such as a CPU, for example. The control unit 54 includes a movement destination information acquisition unit 60, a work setting unit 62, and a movement information acquisition unit 64. By reading and executing a program (software) from the storage unit 52, the control unit 54 implements the movement destination information acquisition unit 60, the work setting unit 62, and the movement information acquisition unit 64, and executes those processing. Note that the control unit 54 may execute such processing with a single CPU or may include a plurality of CPUs and execute the processing with the plurality of CPUs. At least a part of the movement destination information acquisition unit 60, the work setting unit 62, and the movement information acquisition unit 64 may be implemented by a hardware circuit. The program for the control unit 54 stored in the storage unit 52 may be stored in a recording medium that is readable by the information processing device 14.

The movement destination information acquisition unit 60 acquires the movement destination information, the work setting unit 62 sets the route R of the mobile body 10, and the movement information acquisition unit 64 acquires movement information on the mobile body 10. Specific contents of the above-described processing will be described below.

Note that, in the present embodiment, the management device 12 and the information processing device 14 are separate devices, but may be an integrated device. That is, the management device 12 may have at least a part of the function of the information processing device 14, and the information processing device 14 may have at least a part of the function of the management device 12.

Control Device for Mobile Body

Figure 5:
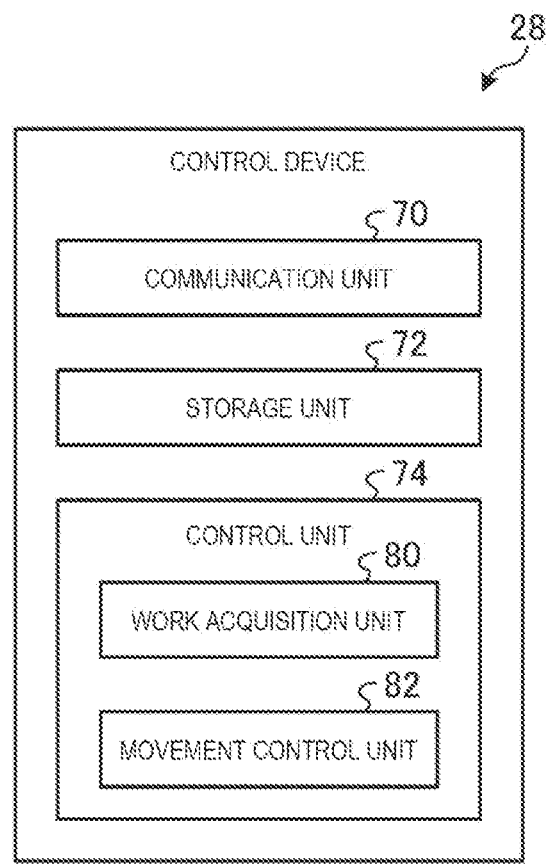
FIG. 5 is a schematic block diagram of a control device for the mobile body.

Next, the control device 28 for the mobile body 10 will be described. FIG. 5 is a schematic block diagram of a control device for the mobile body. The control device 28 is a device for controlling the mobile body 10. The control device 28 is a computer and includes a communication unit 70, a storage unit 72, and a control unit 74 as illustrated in FIG. 5. The communication unit 70 is a module used by the control unit 74 to communicate with an external device such as the information processing device 14, and may include, for example, an antenna or a Wi-Fi module. The communication method of the communication unit 70 is wireless communication in the present embodiment, but any communication method may be used. The storage unit 72 is a memory for storing various information such as computation contents of the control unit 74 and programs, and includes, for example, at least one of a primary storage device such as a RAM or a ROM, and an external storage device such as an HDD.

The control unit 74 is an arithmetic device and includes an arithmetic circuit such as a CPU, for example. The control unit 74 includes a work acquisition unit 80 and a movement control unit 82. By reading and executing a program (software) from the storage unit 72, the control unit 74 implements the work acquisition unit 80 and the movement control unit 82, and executes those processing. Note that the control unit 74 may execute such processing with a single CPU or may include a plurality of CPUs and execute the processing with the plurality of CPUs. At least a part of the work acquisition unit 80 and the movement control unit 82 may be implemented by a hardware circuit. In addition, the program for the control unit 74 stored in the storage unit 72 may be stored in a recording medium that is readable by the control device 28.

The work acquisition unit 80 acquires information indicating the route R of the mobile body 10, the movement control unit 82 controls a movement mechanism such as a drive unit or a steering device of the mobile body 10 so as to control the movement of the mobile body 10. Specific contents of the above-described processing will be described below.

Processing of Movement Control System

Next, the processing contents of the movement control system 1 will be described.

Setting of Movement Destination Information

The movement destination information setting unit 40 of the management device 12 sets movement destination information indicating a movement destination of the mobile body 10. The movement destination information includes information indicating the position of the movement destination of the mobile body 10. More specifically, in the present embodiment, the movement destination information setting unit 40 sets the movement destination information so as to include first position information (position information of a first position) and second position information (position information of a second position). The first position is a position which the mobile body 10 reaches first, and the second position is a position which the mobile body 10 reaches next to the first position. That is, in the example of the present embodiment, the first position is the position of a conveyance source of the target object P, and the second position is the position of a conveyance destination of the target object P. The movement destination information setting unit 40 may directly specify the position (coordinates) of the first position as the first position information. In addition, an identifier may be assigned to each waypoint A, and the movement destination information setting unit 40 may specify the identifier of a waypoint A corresponding to the first position as the first position information. The same applies to the second position information.

FIG. 6 is a table showing an example of movement destination information. In the present embodiment, the movement destination information setting unit 40 sets the movement destination information for each target object P to be conveyed, in other words, for each work. That is, the movement destination information setting unit 40 associates target object information indicating a target object P to be conveyed, the first position information that is the conveyance source of the target object P, and the second position information indicating the conveyance destination of the target object P with each other so as to set the movement destination information for each target object P. Note that, for example, an identifier may be assigned to each target object P, and information indicating the identifier may be used as the target object information. Further, as illustrated in FIG. 6, in the present embodiment, it is preferable for the movement destination information setting unit 40 to associate the target object information, the first position information, the second position information, and priority information with each other so as to set the movement destination information for each target object P. The priority information is information indicating a priority order for conveying a target object P among a group of movement destination information for each target object P. That is, for example, a target object P having the highest priority in the priority information is to be conveyed first. FIG. 6 shows an example in which pieces of movement destination information are set as follows: movement destination information in which the priority is 0001 (first), the target object is P1, the first position is A1, and the second position is A2; movement destination information in which the priority is 0002 (second), the target object is P11, the first position is A11, and the second position is A3; movement destination information in which the priority is 0003 (third), the target object is P21, the first position is A21, and the second position is A4; movement destination information in which the priority is 0004 (fourth), the target object is P2, the first position is A31, and the second position is A5; and movement destination information in which the priority is 0005 (fifth), the target object is P21, the first position is A41, and the second position is A6. However, FIG. 6 is only an example, and the movement destination information may be optionally set in accordance with an order status or the like.

In addition, the movement destination information setting unit 40 may set the movement destination information so as to include designation information for designating a mobile body 10 to move from the first position to the second position (a mobile body 10 to perform the work). That is, in the example of the present embodiment, the movement destination information setting unit 40 may associate the target object information, the first position information, the second position information, the priority information, and the designation information with each other so as to set the movement destination information for each target object P. In that case, for example, an identifier may be assigned to each mobile body 10, and information indicating the identifier may be used as the designation information.

The movement destination information setting unit 40 may set the movement destination information in any method. For example, the movement destination information setting unit 40 may acquire an order information indicating a target object P to be conveyed, a conveyance source, and a conveyance destination, and set the movement destination information based on the order information. The movement destination information setting unit 40 transmits the set movement destination information to the information processing device 14 via the communication unit 30.

Acquisition of Movement Destination Information

The movement destination information acquisition unit 60 of the information processing device 14 acquires the movement destination information from the management device 12 via the communication unit 50.

Setting of Work

The work setting unit 62 of the information processing device 14 sets a work of the mobile body 10 based on the movement destination information. The work setting unit 62 sets the route R of the mobile body 10 to the movement destination as the work of the mobile body 10. In the present embodiment, the work setting unit 62 sets, as the route R of the mobile body 10, a first route to the first position (conveyance source) indicated by the first position information from an initial position at which the mobile body 10 is located immediately before starting to move to the first position and a second route to the second position (conveyance destination) indicated by the second position information from the first position. That is, the work setting unit 62 sets the route R of the mobile body 10 such that respective waypoints A from the initial position to the first position are set as the first route, and respective waypoints A from the first position to the second position are set as the second route. In the example of FIG. 1, the movement destination information indicates that the first position is a waypoint Ab and the second position is a waypoint Ac, and the work setting unit 62 sets, as the route R of the mobile body 10, the first route passing through respective waypoints A from the waypoint Aa, which is the initial position of the mobile body 10 selected, to the waypoint Ab and the second route passing through respective waypoints A from the waypoint Ab to the waypoint Ac.

FIG. 7 is a table for explaining the setting of the work. When a plurality of mobile bodies 10 are deployed in the facility W, the work setting unit 62 selects a mobile body 10 that conveys a target object P as the work of the mobile body 10. Also, when the movement destination information is set for a plurality of target objects P, the work setting unit 62 sets the route R of a mobile body 10 for each target object P. That is, the work setting unit 62 selects, for each target object P, a mobile body 10 that conveys the target object P, and sets the route of the selected mobile body 10. In the example of FIG. 7, the work setting unit 62 selects a mobile body 10A as the mobile body 10 that conveys a target object P1 indicated by the movement information, and sets a route from the initial position of the mobile body 10A, through A1 as the first position, to A2 as the second position ( . . . waypoint A1 . . . ). Descriptions of mobile bodies selected for other target objects P illustrated in FIG. 7 and the routes (waypoints) thereof are the same as those above, and thus are omitted. Note that the work setting unit 62 may select a mobile body 10 in any manner, and may select a mobile body 10 for each target object P such that the time until the completion of the conveyance of all the target objects P is the shortest, for example. In the case where a target mobile body 10 has been designated as the designation information in the movement destination information, it is only necessary to select the mobile body 10 designated in the designation information.

The work setting unit 62 transmits information on the set work to the mobile body 10 to which the set work is assigned. In the example of FIG. 7, the work setting unit 62 transmits information on the work for the target object P1 and information on the work for the target object P2 to the mobile body 10A. The work setting unit 62 transmits information on the route R as the information on the work. The work setting unit 62 transmits information indicating respective waypoints A through which the route R passes as the information on the route R. For example, the work setting unit 62 may transmit position (coordinate) information of respective waypoints A through which the route R passes to the mobile body 10 as the information on the route R, or may transmit information indicating the identifiers of respective waypoints A through which the route R passes to the mobile body 10 as the information on the route R.

Movement of Mobile Body

The work acquisition unit 80 of a mobile body 10 acquires information on the route R set for the mobile body 10 from the information processing device 14. The movement control unit 82 of the mobile body 10 moves the mobile body 10 along the route R acquired. The movement control unit 82 moves the mobile body 10 so that the mobile body 10 passes through respective waypoints A through which the route R passes. The mobile body 10 moves so as to pass through each waypoint A on the route R by sequentially grasping the position information of the mobile body 10 through the movement control unit 82. The method of acquiring the position information of the mobile body 10 through the movement control unit 82 is optional. In the present embodiment, for example, a detection body (not illustrated) is disposed in the facility W, and the movement control unit 82 acquires the information on the position and the orientation of the mobile body 10 based on the detection of the detection body. Specifically, the mobile body 10 irradiates the detection body with a laser beam, receives light of the laser beam reflected from the detection body, and detects the position and the orientation of the mobile body 10 in the facility W. The method of acquiring the information on the position and the orientation of the mobile body 10 is not limited to using a detection body, and simultaneous localization and mapping (SLAM) may be used, for example.

In the example of FIG. 1, the movement control unit 82 causes the mobile body 10 to move from the waypoint Aa, which is the initial position, to the waypoint Ab, which is the first position, so as to pass through each waypoint A from the waypoint Aa to the waypoint Ab. When the mobile body reaches the waypoint Ab, the movement control unit 82 controls the fork 24 to insert the fork 24 into the opening Pb of the target object P placed in the placement area AR1 facing the waypoint Ab so as to pick up (load) the target object P. In this case, the movement control unit 82 may cause the sensor 26A to detect the position and the orientation of the target object P at the waypoint Ab or at any position before reaching the waypoint Ab. Then, the movement control unit 82 may set an approach route to the target object P based on the position and the orientation of the target object P, and approach the target object P along the approach route to pick up the target object P. That is, in that case, the movement control unit 82 may set a new approach route that allows a predetermined position and a predetermined orientation with respect to the position and the orientation of the target object P detected (the position and the orientation at which the mobile body 10 can pick up the target object P), and approach the target object P along the approach route. Alternatively, for example, the movement control unit 82 may cause the mobile body 10 to approach the target object P by performing feedback control (direct feedback control) based on the detection result of the position and the orientation of the target object P and the detection result of the position and the orientation of the mobile body 10. In that case, switching to the direct feedback control may be performed during the approach along a route based on the position and the orientation of the target object P.

After the mobile body 10 picks up the target object P, the movement control unit 82 causes the mobile body 10 to return to the waypoint Ab and then move to the waypoint Ac, which is the second position, so as to pass through each waypoint A from the waypoint Ab to the waypoint Ac. When the mobile body 10 reaches the waypoint Ac, the movement control unit 82 controls the fork 24 to drop (unload) the target object P in the placement area AR1 facing the waypoint Ac.

After the mobile body 10 drops the target object P, the movement control unit 82 causes the mobile body 10 to return to the waypoint Ac. When a next route R in which the waypoint Ac is the initial position has already been set, the movement control unit 82 causes the mobile body 10 to move along that route R.

Note that the movement control unit 82 moves the mobile body 10 while causing the sensor 26A to detect the surroundings. The movement control unit 82 determines whether keeping moving the mobile body 10 causes the mobile body 10 to interfere with a surrounding object detected by the sensor 26A and stops the movement of the mobile body 10 when it is determined that the mobile body interferes with the surrounding object. This suppresses the mobile body 10 from colliding with surrounding objects such as another mobile body and an obstacle. A determination criterion as to whether the surrounding object interferes with the mobile body 10 may be optional, and it may be determined that the object interferes when the distance from the mobile body to the object becomes less than a predetermined threshold value, for example.

Exclusive Area

Here, the mobile body 10 is controlled to move while suppressing collision with surrounding objects as described above, but a deadlock may occur between the mobile bodies 10. On the other hand, in the present embodiment, setting an exclusive area T for the mobile body 10 in motion suppresses the occurrence of a deadlock. The exclusive area T is an area occupied by the mobile body 10. That is, the mobile body 10 is permitted to enter the exclusive area T, but the other mobile body 10 is prohibited to enter the exclusive area T. Hereinafter, a setting method of the exclusive area T will be specifically described. Note that "deadlock" refers to a phenomenon in which each of a plurality of running programs or the like mutually waits for a result of other programs, and remains in a standby state and does not operate. In the present embodiment, "deadlock" may refer to a phenomenon in which the mobile bodies 10 remain stopped if there is a possibility that the mobile bodies 10 will collide with each other when the mobile bodies 10 keep moving along the current routes, and if it is impossible to set avoidance routes toward travel direction sides.

Acquisition of Movement Information

Figure 8:
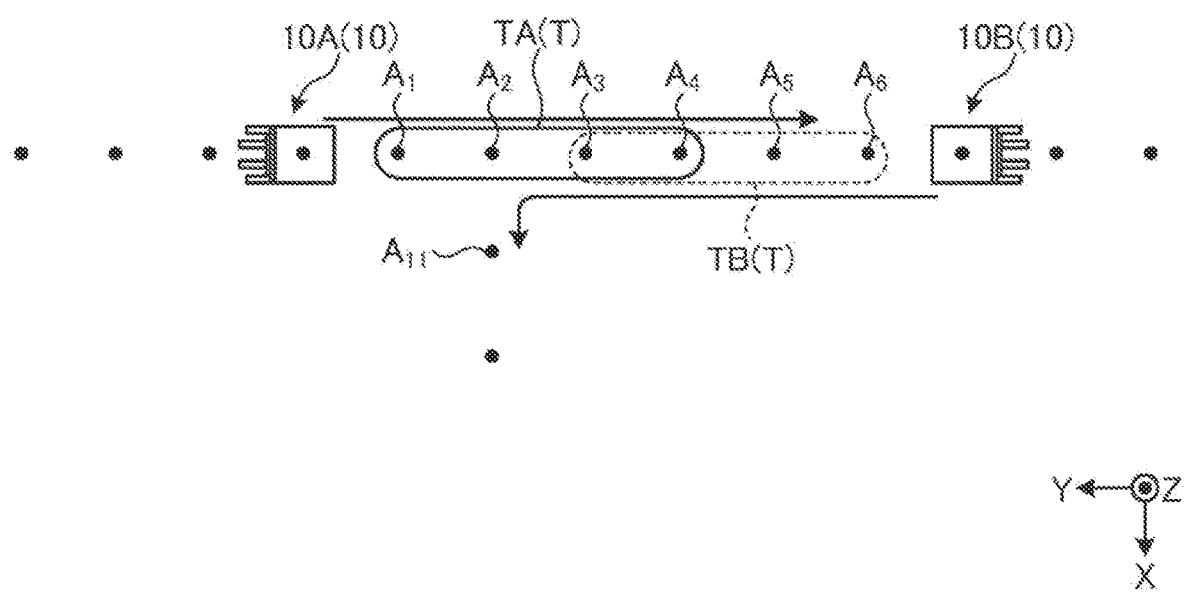
FIG. 8 is a schematic view for explaining setting of an exclusive area.
Figure 9:
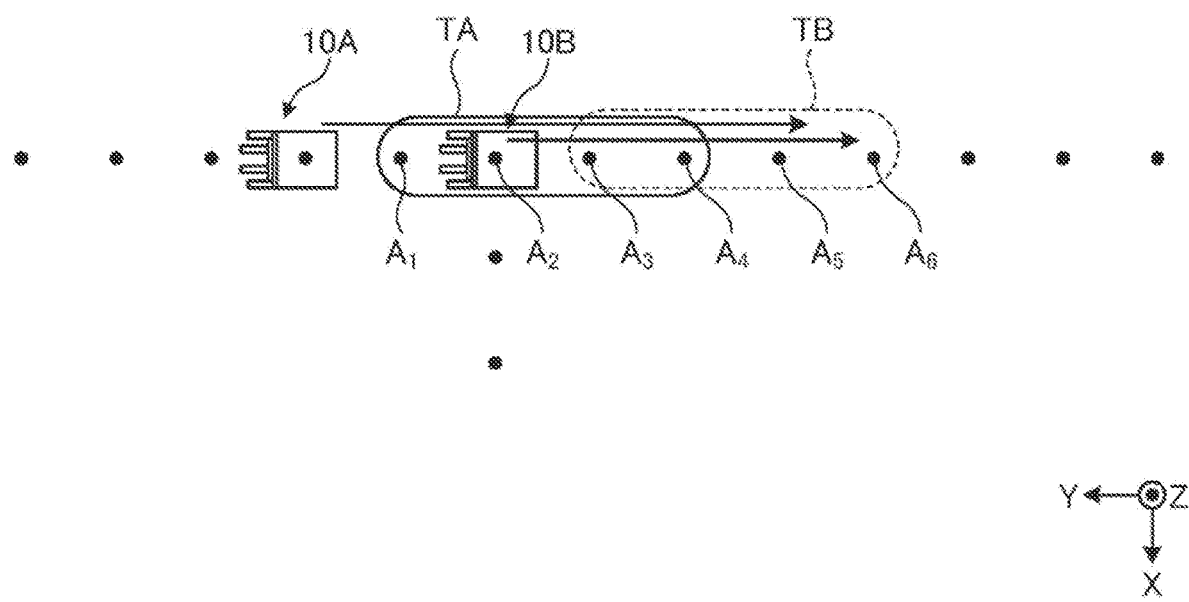
FIG. 9 is a schematic view for explaining setting of an exclusive area.

FIGS. 8 and 9 are schematic views for explaining setting of the exclusive area. Hereinafter, the mobile body 10 that is a setting target of the exclusive area T will be described as the first mobile body, and a time slot in which the exclusive area T is set will be described as the first time slot. In this case, the movement information acquisition unit 64 of the information processing device 14 acquires movement information on the first mobile body. The movement information acquisition unit 64 acquires, as movement information, position information on the first position where the first mobile body is scheduled to be positioned in the first time slot and information on the travel direction of the first mobile body.

The movement information acquisition unit 64 may acquire the position information on the first position by any method, and may acquire the position information on the first position based on the position information on the first mobile body, for example. In this case, for example, the movement information acquisition unit 64 may acquire the current position information on the first mobile body from the first mobile body, calculate the predicted position of the first mobile body in the first time slot based on the current position information on the first mobile body, and set the predicted position as the first position. For example, the first mobile body may calculate the predicted position of the first mobile body in the first time slot as the first position based on the current position information, and the movement information acquisition unit 64 may acquire, from the first mobile body, the position information on the first position calculated.

The information on the travel direction of the first mobile body is information indicating the travel direction of the first mobile body in the route R. Since the route R (respective waypoints A to pass) of the first mobile body is set in advance by the work setting unit 62, it is deemed that the travel direction of the first mobile body is also set in advance. Therefore, the movement information acquisition unit 64 can acquire the information on the travel direction of the first mobile body from the information on the route R of the first mobile body.

FIG. 8 illustrates an example in which the first position of the mobile body 10A (first mobile body) in the first time slot is the waypoint $A_1$, and the travel direction of the mobile body 10A at the waypoint $A_1$ is a direction opposite to the Y direction (direction from the waypoint $A_1$ toward the waypoint $A_2$).

Setting of Second Position

The work setting unit 62 of the information processing device 14 sets the exclusive area T of the first mobile body based on the movement information on the first mobile body. The work setting unit 62 sets the second position, which is a position on the travel direction side from the first position, based on the position information on the first position and the travel direction in the first time slot. The work setting unit 62 may set any position on the travel direction side from the first position as the second position, and in the present embodiment, the second position is set based on the speed of the first mobile body. For example, the work setting unit 62 may calculate a distance L based on the following Formula (1) and set, as the second position, a position separated by the distance L from the first position toward the travel direction side. Note that the speed of the first mobile body here may be acquired optionally, and for example, the preset speed limit of the mobile body 10 may be set as the speed of the first mobile body, or the measured actual speed may be set as the speed of the first mobile body.

$$L = C_1 \cdot V^2 + C_2 \cdot V + C_3 \qquad (1)$$

V in Formula (1) is a moving speed of the first mobile body, and $C_1$, $C_2$, and $C_3$ are preset coefficients. The coefficient $C_1$ is preferably set in consideration of the braking distance of the mobile body 10. The coefficient $C_2$ is preferably set in consideration of an assumed maximum delay time (maximum delay time of arrival time at the first position) and a communication time between the mobile body 10 and the information processing device 14. The coefficient $C_3$ is preferably set in consideration of the size of the mobile body 10.

FIG. 8 illustrates an example in which the waypoint $A_4$ present in the direction opposite to the Y direction from the waypoint $A_1$ is set as the second position.

(Setting of Exclusive Area)

The work setting unit 62 sets an area (route) between the first position and the second position, in other words, an area on the front side in the travel direction from the first position, as the exclusive area T of the first mobile body in the first time slot. Furthermore, the work setting unit 62 sets, as the exclusive area T of the first mobile body in the first time slot, an area from the first position to the second position, in other words, respective waypoints A from the waypoint A set as the first position to the waypoint A set as the second position. The work setting unit 62 sets position information on the area between the first position and the second position, that is, information indicating the position of the exclusive area T, as information on the exclusive area T. Furthermore, in addition to the information indicating the position of the exclusive area T, the work setting unit 62 also sets, as information on the exclusive area T, information on the travel direction of the first mobile body in the exclusive area T. FIG. 8 gives an example in which the area from the waypoint $A_1$, which is the first position, to the waypoint A4, which is the second position, that is, the waypoints $A_1$, $A_2$, $A_3$, and $A_4$, are set as an exclusive area TA of the mobile body 10A in the first time slot, and the travel direction of the mobile body 10A in the exclusive area TA is on the side opposite to the Y direction (direction connecting waypoints $A_1$, $A_2$, $A_3$, and $A_4$).

More specifically, the work setting unit 62 determines whether the exclusive area T of the first mobile body can be set based on the position information on the first position and the second position, the movement information on the first mobile body in the first position, and the information on the exclusive area T of another mobile body. Specifically, the work setting unit 62 acquires, as information on the exclusive area T of another mobile body, the position information on the exclusive area T already set for a mobile body other than the first mobile body and the information on the travel direction of the mobile body in the exclusive area T. Then, the work setting unit 62 determines whether there is an overlapping exclusive area in the exclusive area T of the other mobile body. The overlapping exclusive area is an exclusive area T that is set in the first time slot, overlaps an area (respective waypoints A) from the first position to the second position for the first mobile body, and has a travel direction different from the travel direction of the first mobile body. The exclusive area T of another mobile body overlapping the area from the first position to the second position of the first mobile body means that at least parts of the respective areas overlap each other. The travel direction being different from the travel direction of the first mobile body means that the travel direction of the first mobile body is different from the travel direction of the other mobile body in the overlapping area and furthermore means that the travel direction of the first mobile body is opposite to the travel direction of the other mobile body in the overlapping area.

When there is the overlapping exclusive area, the work setting unit 62 does not set the exclusive area T of the first mobile body in the first time slot. That is, the work setting unit 62 does not set the exclusive area T of the first mobile body in a case where the other mobile body 10 has already reserved a position overlapping in different travel directions in the same time slot. FIG. 8 gives an example of a case where the waypoints $A_6$, $A_5$, $A_4$, and $A_3$ have been set as an exclusive area TB of the mobile body 10B in the first time slot with the Y direction (direction connecting the waypoints $A_6$, $A_5$, $A_4$, and $A_3$) as the travel direction. In this case, the travel direction of the mobile body 10A is opposite to the travel direction of the mobile body 10B in the exclusive area TB, and the area from the first position to the second position is the waypoints $A_1$, $A_2$, $A_3$, and $A_4$ and overlap the exclusive area TB. Therefore, the exclusive area TA of the mobile body 10A is not set.

On the other hand, when there is no overlapping exclusive area, the work setting unit 62 sets the area from the first position to the second position as the exclusive area of the first mobile body in the first time slot. That is, the work setting unit 62 sets the exclusive area T of the first mobile body when an overlapping position is not reserved by the other mobile body 10 in the same time slot. Furthermore, the work setting unit 62 sets the exclusive area T in a case where the travel direction of the other mobile body 10 is the same as the travel direction of the first mobile body even if the other mobile body 10 has reserved the position overlapping in the same time slot. FIG. 9 gives an example of a case where the waypoints $A_3$, $A_4$, $A_5$, and $A_6$ have been set as an exclusive area TB of the mobile body 10B in the first time slot with the opposite direction to the Y direction (direction connecting the waypoints $A_3$, $A_4$, $A_5$, $A_6$) as the travel direction. In this case, the area from the first position to the second position of the mobile body 10A is the waypoints $A_1$, $A_2$, $A_3$, and $A_4$ and overlaps the exclusive area TB, but the travel direction is the same as the travel direction of the mobile body 10B in the exclusive area TB. Therefore, the exclusive area TA of the mobile body 10A is set.

(Transmission of Exclusive Area)

After setting the exclusive area T of the first mobile body, the work setting unit 62 outputs, to the first mobile body, a command to permit movement within the exclusive area T in the first time slot. After acquiring the command to permit movement within the exclusive area T in the first time slot, the first mobile body can move within the exclusive area T in the first time slot. On the other hand, when the exclusive area TA of the mobile body 10A is not set, the work setting unit 62 outputs, to the first mobile body, a command not to permit movement within the exclusive area T in the first time slot. However, not limited to this, the work setting unit 62 needs not output the command not to permit movement to the first mobile body. After acquiring the command not to permit or in a case of not acquiring the command to permit, the first mobile body does not move within the exclusive area T in the first time slot. That is, in this case, the first mobile body does not enter the exclusive area T and is positioned outside the exclusive area T in the first time slot.

After the exclusive area T of the first mobile body is set in the first time slot, the work setting unit 62 does not permit the other mobile body 10 (second mobile body) to move within the exclusive area T in a travel direction different from that of the first mobile body in the first time slot. That is, in the example of FIG. 8, in a case where the exclusive area TA of the mobile body 10A is set, the exclusive area TB is not set for the mobile body 10B, and the mobile body 10B cannot move the waypoints $A_6$, $A_5$, $A_4$, and $A_3$ in the first time slot. On the other hand, the work setting unit 62 permits the other mobile body 10 (second mobile body) to move within the exclusive area T in the same direction as that of the first mobile body in the first time slot. That is, in the example of FIG. 9, in a case where the exclusive area TA of the mobile body 10A is set, the exclusive area TB is set for the mobile body 10B, and the mobile body 10B can move the waypoints $A_3$, $A_4$, $A_5$, and $A_6$ in the first time slot.

The movement information acquisition unit 64 executes the processing of setting the exclusive area T and outputting a command as described above for each mobile body 10 at predetermined time intervals. That is, the movement information acquisition unit 64 sequentially updates the exclusive area T in accordance with the movement of each mobile body 10 by setting the exclusive area T on the front side of the mobile body 10 in the travel direction at predetermined time intervals for each mobile body 10.

Example of Exclusive Area at Intersection

Figure 10:
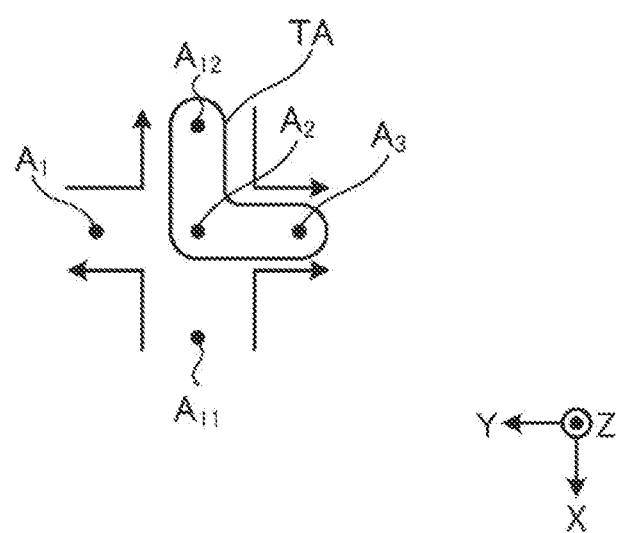
FIG. 10 is a schematic view explaining an example of setting of an exclusive area at an intersection.

FIG. 10 is a schematic view explaining an example of setting of an exclusive area at an intersection. FIG. 10 gives an example of a case where the route connecting the waypoints $A_1$, $A_2$, and $A_3$ and the route connecting the waypoints $A_{12}$, $A_2$, and $A_{11}$ intersect with each other. In FIG. 10, the waypoints $A_{12}$, $A_2$, and $A_3$ are set in the exclusive area TA with this order as the travel direction. In this case, the route having the waypoints $A_{11}$, $A_2$, and $A_3$ in this order as the travel direction overlaps the exclusive area TA, but the travel direction is the same. Therefore, other mobile bodies can move along this route, in other words, this route can also be set as the exclusive area. The route having the waypoints $A_{11}$, $A_2$, and $A_1$ in this order as the travel direction does not overlap the exclusive area TA. Therefore, other mobile bodies can move along this route, in other words, this route can also be set as the exclusive area. On the other hand, the route having the waypoints $A_1$, $A_2$, and $A_{12}$ in this order as the travel direction overlaps the exclusive area TA and includes a section in which the travel direction is opposite. Therefore, other mobile bodies cannot move along this route, in other words, this route cannot be set as the exclusive area.

Processing Flow

Figure 11:
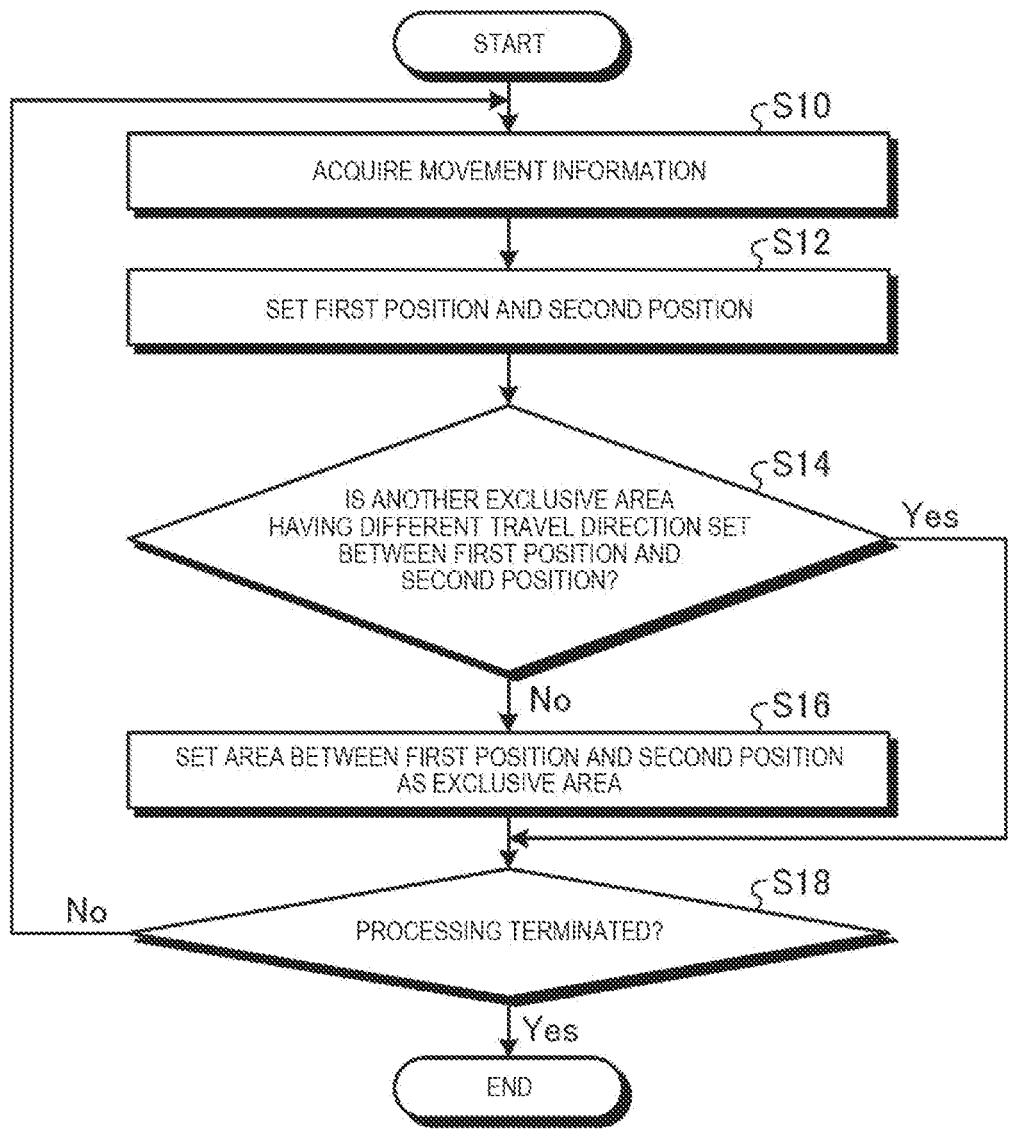
FIG. 11 is a flowchart explaining a setting flow of an exclusive area according to the present embodiment.

Next, a setting flow of the exclusive area T described above will be described. FIG. 11 is a flowchart explaining the setting flow of the exclusive area according to the present embodiment. As illustrated in FIG. 11, in the information processing device 14, the movement information acquisition unit 64 acquires movement information on the first mobile body (step S10), and the work setting unit 62 sets the first position and the second position based on the movement information on the first mobile body (step S12). The work setting unit 62 determines whether the other exclusive area T (overlapping exclusive area) having a different travel direction has been set in the same time slot between the first position and the second position (step S14), and if the overlapping exclusive area has not been set (step S14; No), the work setting unit 62 sets an area between the first position and the second position as the exclusive area T of the first mobile body (step S16). Thereafter, the process proceeds to step S18, and if the processing is to be ended (step S18; Yes), this processing is ended, and if the processing is not to be ended (step S18; No), the process returns to step S10, and the setting processing of the exclusive area T in the next time slot is continued. Also in a case where the overlapping exclusive area has been set, the processing proceeds to step S18, and the setting processing of the exclusive area T in the next time slot may be continued.

As described above, in the present embodiment, the area on the front side in the travel direction of the first mobile body, that is, the area between the first position and the second position is set as the exclusive area T. The exclusive area T is set such that a mobile body traveling in a travel direction different from that of the first mobile body cannot enter, but a mobile body traveling in the same travel direction as that of the first mobile body can enter. In this way, setting the area on the front side in the travel direction as the exclusive area T can suppress occurrence of a deadlock even when, for example, a delay occurs in the movement of the mobile body 10. Setting the exclusive area T so as not to permit entry of a mobile body traveling in a different travel direction can appropriately suppress a deadlock due to mobile bodies 10 traveling in different directions facing each other. The deadlock can be suppressed by a simple procedure of not permitting movement in a different travel direction. Furthermore, setting the exclusive area T so as to permit entry of a mobile body traveling in the same travel direction reduces the movement restriction of the mobile body in the same direction where the risk of deadlock is low and can improve the throughput.

Second Embodiment

Next, a second embodiment will be described. The second embodiment is different from the first embodiment in the setting method of the exclusive area T. In the second embodiment, the description of parts having the same configuration as those in the first embodiment will be omitted.

Figure 12:
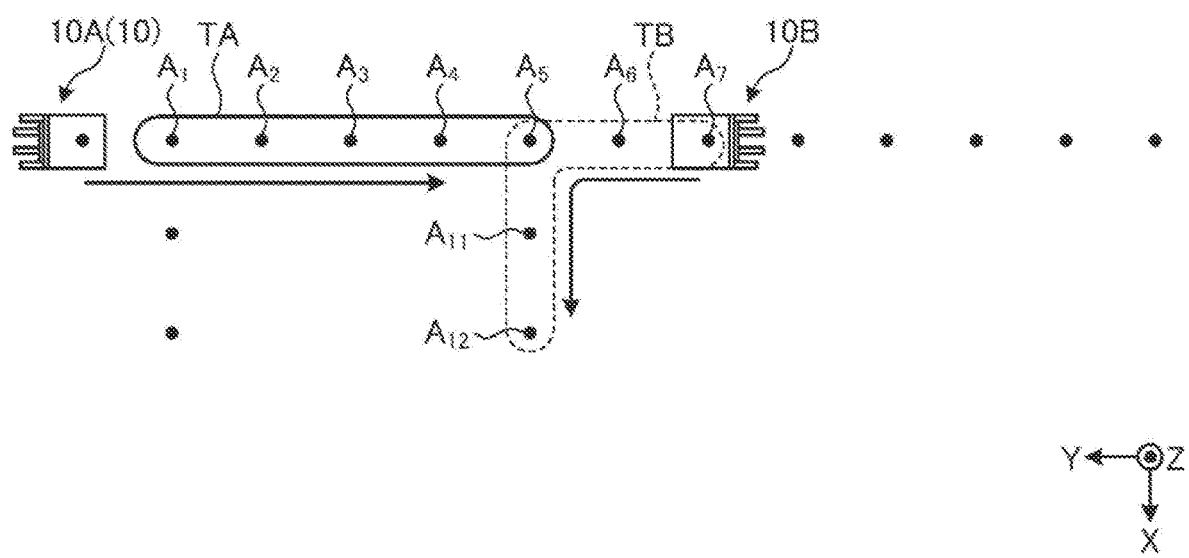
FIG. 12 is a schematic view illustrating an example of an exclusive area in a second embodiment.

FIG. 12 is a schematic view illustrating an example of an exclusive area in the second embodiment. Here, on a route where the first mobile body is scheduled to move, a position where the route branches to (intersects with) another route is defined as a first branch position, and a position where the route branches to (intersects with) another route next to the first branch position in the travel direction is defined as a second branch position. That is, the route does not branch to another route between the first branch position and the second branch position. In this case, when the second position set is positioned between the first branch position and the second branch position, the work setting unit 62 sets the first position to the second branch position as the exclusive area T. In the example of FIG. 12, the first position of the mobile body 10A is the waypoint $A_1$, and the second position is the waypoint $A_4$. Then, since the waypoint $A_4$ is positioned between the waypoint $A_1$ that is the first branch position and the waypoint $A_5$ that is the second branch position, the work setting unit 62 sets respective waypoints A from the waypoint $A_1$ to the waypoint $A_5$ as the exclusive area TA of the mobile body 10A in the first time slot. Therefore, the exclusive area TB in which the mobile body 10B has the waypoints $A_7$, $A_6$, $A_5$, $A_{11}$, and $A_{12}$ in this order as the travel direction is not set because the waypoint $A_5$ overlaps the exclusive area TA and the travel direction at the waypoint $A_5$ is opposite.

As described above, in the second embodiment, when the second position is positioned on a non-branch route between the first branch position and the second branch position, the exclusive area T is extended to the second branch position adjacent to the second position on the travel direction side. This can more suitably suppress the deadlock. For example, in FIG. 12, if the area up to the waypoint $A_4$, which is the second position, is set as the exclusive area TA, the mobile body 10B can enter the area up to the waypoint $A_5$ in the same time slot. In this case, the mobile body 10A moves on the opposite side of the Y direction toward the waypoint $A_5$, and the mobile body 10B moves on the Y direction side from the waypoint $A_5$. This may cause the mobile bodies 10A and 10B to face each other and cause a deadlock. On the other hand, in the second embodiment, since the area up to the waypoint $A_5$, which is the second branch position, is set to the exclusive area TA, the mobile body 10B cannot enter the area up to the waypoint $A_5$, and the deadlock can be suitably suppressed.

Figure 13:
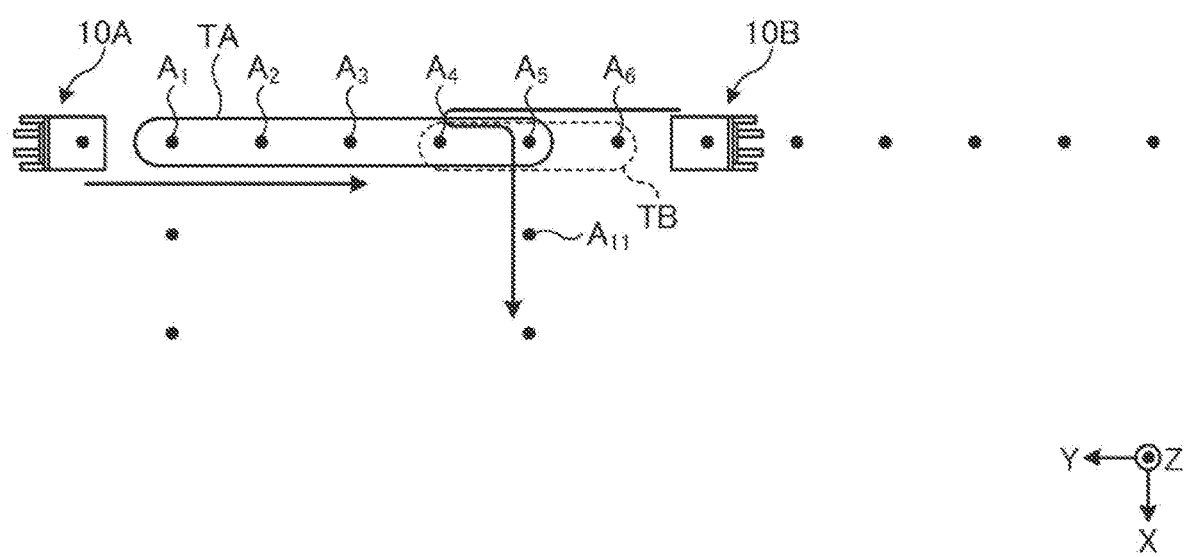
FIG. 13 is a schematic view illustrating another example of the exclusive area in the second embodiment.

FIG. 13 is a schematic view illustrating another example of the exclusive area in the second embodiment. Here, as illustrated in FIG. 13, there is a case of setting, as the route of the mobile body 10B, a route for entering the exclusive area TA in a direction opposite to the travel direction of the mobile body 10A, and then turning back to the same direction as the travel direction of the mobile body 10A. As described above, in a case where the route of the mobile body 10B is directed to the opposite side of the travel direction of the mobile body 10A in the exclusive area TA and then turns back to the same direction side, the work setting unit 62 may set the exclusive area TB of the mobile body 10B. That is, in the example of FIG. 13, when the route of the mobile body 10B is in the order of the waypoints $A_6$, $A_5$, $A_4$, and $A_5$, the work setting unit 62 may set, as the exclusive area TB for the mobile body 10B, the waypoint $A_6$, which is the first position, the waypoint $A_5$, and the waypoint $A_4$, and $A_5$, which is the second position. That is, a deadlock with the mobile body 10A does not occur when the mobile body 10B is directed to the side opposite to the travel direction of the mobile body 10A, but later turns back and is directed to the travel direction side of the mobile body 10A. Therefore, even if the exclusive area TA of the mobile body 10A is set, the exclusive area TB of the mobile body 10B can be set.

Third Embodiment

Next, a third embodiment will be described. The second embodiment is different from the first embodiment in the setting method of the exclusive area T. In the third embodiment, the description of parts having the same configuration as those in the first embodiment will be omitted. The third embodiment can also be applied to the second embodiment.

Figure 14:
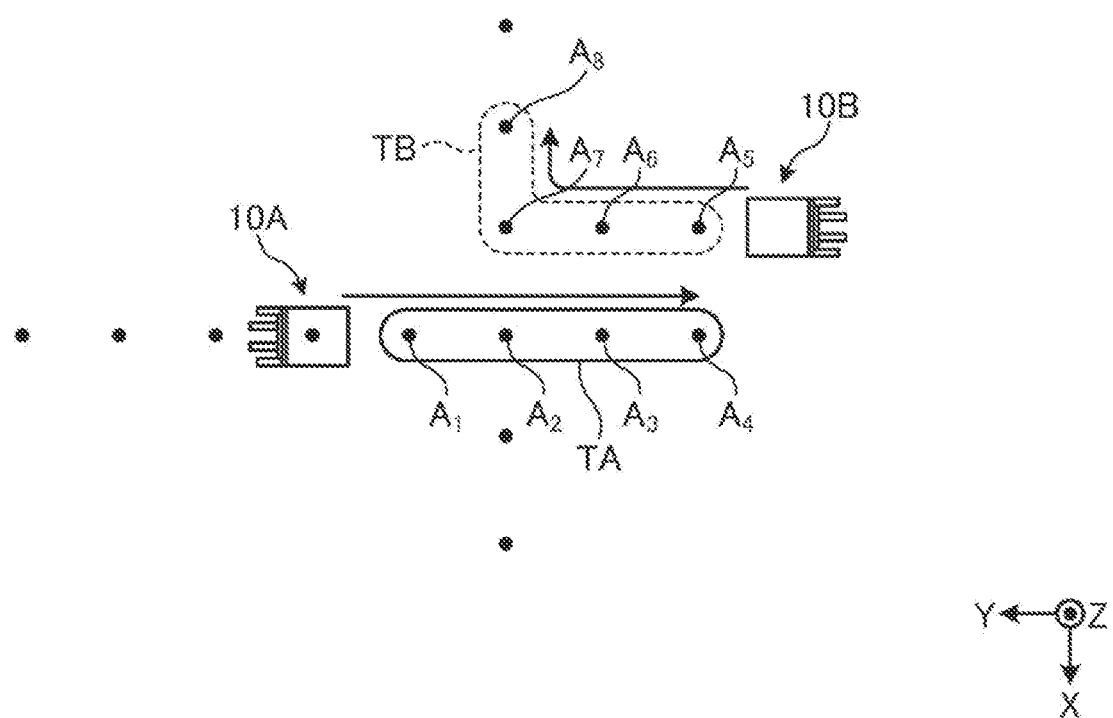
FIG. 14 is a schematic view illustrating an example of an exclusive area in a third embodiment.

FIG. 14 is a schematic view illustrating an example of an exclusive area in the third embodiment. The work setting unit 62 determines whether there is a neighboring exclusive area in the exclusive area T of another mobile body. The neighboring exclusive area refers to an exclusive area set on a route (waypoint A) at a position different from but close to the route of the first mobile body. Specifically, the neighboring exclusive area is the exclusive area T that is set in the first time slot (time slot in which the exclusive area of the first mobile body is set), exists within a predetermined distance range with respect to the area (respective waypoints A) from the first position to the second position for the first mobile body, and has a travel direction different from the travel direction of the first mobile body in a section that is within the predetermined distance range. Here, a travel direction being different from the travel direction of the first mobile body is not limited to the travel direction being opposite to the travel direction of the first mobile body and includes a direction intersecting the travel direction of the first mobile body. The predetermined distance here may be optionally set. For example, in a case where the mobile bodies 10 are positioned at respective positions separated by a predetermined distance, a distance at which the mobile bodies 10 interfere with each other may be set as the predetermined distance.

When there is the neighboring exclusive area, the work setting unit 62 does not set the exclusive area T of the first mobile body in the first time slot. That is, the work setting unit 62 does not set the exclusive area T of the first mobile body when the other mobile body 10 has reserved a route close in a different travel direction in the same time slot. FIG. 14 gives an example of a case where the waypoints $A_5$, $A_6$, $A_7$, and $A_8$ have been set as the exclusive area TB of the mobile body 10B in the first time slot with the Y direction (direction connecting waypoints $A_5$, $A_6$, $A_7$, $A_8$) as the travel direction. In this case, the travel direction of the mobile body 10A is opposite to the travel direction of the mobile body 10B in the exclusive area TB, and the area from the first position to the second position is the waypoints $A_1$, $A_2$, $A_3$, and $A_4$, and is within a predetermined distance range with respect to the exclusive area TB. Therefore, the exclusive area TA of the mobile body 10A is not set.

On the other hand, when there is no neighboring exclusive area, the work setting unit 62 sets the area from the first position to the second position as the exclusive area of the first mobile body in the first time slot. That is, the work setting unit 62 sets the exclusive area T of the first mobile body when a neighboring position has not been reserved by the other mobile body 10 in the same time slot. Furthermore, even if the other mobile body 10 has reserved a neighboring position (neighboring exclusive area) in an overlapping time slot, the work setting unit 62 sets the exclusive area T when the travel direction of the mobile body 10 is the same as the travel direction of the first mobile body. That is, in the example of FIG. 14, when the travel direction of the mobile body 10B in the exclusive area TB is opposite to the Y direction, the waypoints $A_1$, $A_2$, $A_3$, and $A_4$ are set as the exclusive area T of the mobile body 10A.

When the exclusive area T of the first mobile body is set in the first time slot, the work setting unit 62 does not permit the other mobile body 10 (second mobile body) to move along a route within a predetermined distance from the exclusive area T in a travel direction different from that of the first mobile body in the first time slot. That is, in the example of FIG. 14, in a case where the exclusive area TA of the mobile body 10A is set, the exclusive area TB is not set for the mobile body 10B, and the mobile body 10B cannot move the waypoints $A_5$, $A_6$, $A_7$, and $A_8$ in the first time slot. On the other hand, the work setting unit 62 permits the other mobile body 10 (second mobile body) to move within the exclusive area T in the same direction as that of the first mobile body in the first time slot. That is, in the example of FIG. 14, when the travel direction of the mobile body 10B is opposite to the Y direction, the exclusive area TB is also set in the mobile body 10B at the waypoints $A_8$, $A_7$, $A_6$, and $A_5$, and the mobile body 10B can move in the exclusive area TB in the first time slot.

As described above, in the third embodiment, the route is different from the exclusive area T, but when the distance is short, movement on that route is not permitted. Therefore, the occurrence of a deadlock due to the plurality of mobile bodies 10 moving along close routes in the same time slot can be suppressed.

Fourth Embodiment

Next, a fourth embodiment will be described. The fourth embodiment is different from the first embodiment in the setting method of the exclusive area T. In the fourth embodiment, the description of parts having the same configuration as those in the first embodiment will be omitted. The fourth embodiment is also applicable to the second embodiment and the third embodiment.

Figure 15:
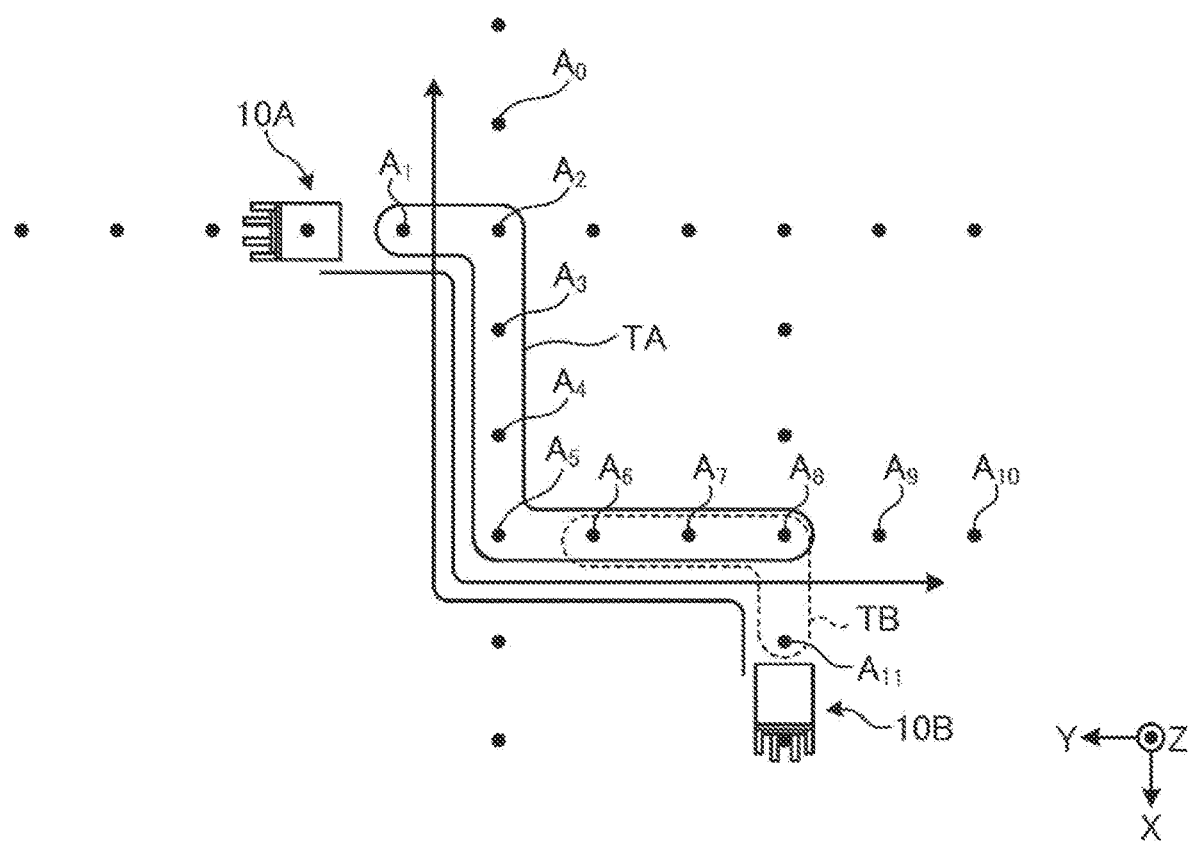
FIG. 15 is a schematic view illustrating an example of an exclusive area in a fourth embodiment.

FIG. 15 is a schematic view illustrating an example of an exclusive area in the fourth embodiment. In the fourth embodiment, the work setting unit 62 acquires information on the route R set for the first mobile body and information on the route R set for a mobile body other than the first mobile body. Then, the work setting unit 62 extracts an overlapping section that is a section overlapping with the route R set for a mobile body other than the first mobile body in the route R set for the first mobile body. The work setting unit 62 determines whether the route between the first position and the second position for the first mobile body overlaps the overlapping section. Here, the route between the first position and the second position overlapping the overlapping section means that at least parts of the route between the first position and the second position and the overlapping section overlap each other. When the route between the first position and the second position overlaps the overlapping section, the work setting unit 62 sets an area from the first position to an end position in the overlapping section as the exclusive area T. The end position in the overlapping section refers to an end on the travel direction side of the first mobile body (waypoint A on the most travel direction side of the first mobile body) in the overlapping section. In the example of FIG. 12, since the route of the mobile body 10A is in the order of the waypoint $A_1$, the waypoints $A_2$ to $A_5$, and the waypoints $A_6$ to $A_{10}$, and the route of the mobile body 10B is in the order of the waypoint $A_{11}$, the waypoints $A_8$ to $A_5$, and the waypoints $A_4$ to $A_0$, the overlapping section is the waypoints $A_2$ to $A_5$ to $A_8$. Then, assuming that the first position of the mobile body 10A is the waypoint $A_1$ and the second position is the waypoint $A_4$, the work setting unit 62 sets the waypoint $A_1$ to the waypoint $A_8$ as the exclusive area TA of the mobile body 10A.

As described above, in the fourth embodiment, when the area from the first position to the second position overlaps the route of the other mobile body 10, the exclusive area T is extended to the final point of the overlapped section. This can more suitably suppress the deadlock in a section in which routes are set in an overlapping manner.

Effects

As described above, the information processing method according to the disclosure includes the steps of: acquiring movement information on a first mobile body including information on a first position through which the first mobile body is scheduled to pass in a first time slot and information on a travel direction of the first mobile body; and setting, as the exclusive area T in the first time slot, an area between the first position and a second position on a travel direction side of the first mobile body from the first position based on the movement information on the first mobile body. The exclusive area T is set in a manner that a second mobile body other than the first mobile body is not permitted to move within the exclusive area T in a travel direction different from the travel direction of the first mobile body in the first time slot and that the second mobile body is permitted to move within the exclusive area T in a travel direction identical to the travel direction of the first mobile body in the first time slot.

According to the disclosure, setting the area on the front side in the travel direction as the exclusive area T in this manner can suppress occurrence of a deadlock even when, for example, a delay occurs in the movement of the mobile body 10. Setting the exclusive area T so as not to permit entry of a mobile body traveling in a different travel direction can appropriately suppress a deadlock due to mobile bodies 10 traveling in different directions facing each other. The deadlock can be suppressed by a simple procedure of not permitting movement in a different travel direction. Furthermore, setting the exclusive area T so as to permit entry of a mobile body traveling in the same travel direction reduces the movement restriction of the mobile body in the same direction where the risk of deadlock is low and can improve the throughput.

In the step of setting the exclusive area T, the second position is set based on the speed of the first mobile body. Setting the second position in this manner can more suitably suppress occurrence of a deadlock.

In the step of setting the exclusive area T, in a case where, on the route on the travel direction side of the first mobile body, the second position is positioned between the first branch position at which the route on the travel direction side is branched to another route and the second branch position at which the route on the travel direction side is branched to another route next to the first branch position, an area from the first position to the second branch position is set as the exclusive area T. Setting the exclusive area T in this manner can more suitably suppress occurrence of a deadlock.

The exclusive area T is set such that the second mobile body is not permitted to move along the route within a predetermined distance range from the exclusive area in the first time slot. Setting the exclusive area T in this manner can suppress the occurrence of a deadlock due to the plurality of mobile bodies 10 moving along close routes in the same time slot.

The information processing method of the disclosure further includes the step of acquiring information on a first route along which the first mobile body is scheduled to move and a second route along which the second mobile body is scheduled to move. In the step of setting the exclusive area T, in a case where the section between the first position and the second position overlaps the overlapping section in which the first route and the second route overlap, the area from the first position to the end position of the overlapping section on the travel direction side of the first mobile body is set as the exclusive area T. This can more suitably suppress the deadlock in a section in which routes are set in an overlapping manner.

The embodiments of the disclosure have been described above, but the embodiment is not limited by the details of the embodiments above. Furthermore, the constituent elements of the above-described embodiments include elements that are able to be easily conceived by a person skilled in the art, and elements that are substantially the same, that is, elements of an equivalent scope. Furthermore, the constituent elements described above can be appropriately combined. Furthermore, it is possible to make various omissions, substitutions, and changes to the constituent elements within a range not departing from the scope of the above-described embodiments.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An information processing method, comprising:
a step of acquiring movement information on a first mobile body including information on a first position through which the first mobile body is scheduled to pass in a first time slot and information on a travel direction of the first mobile body; and
a step of setting, as an exclusive area in the first time slot, an area between the first position and a second position on a travel direction side of the first mobile body from the first position based on the movement information on the first mobile body, wherein
the exclusive area is set in a manner that a second mobile body other than the first mobile body is not permitted to move within the exclusive area in a travel direction different from the travel direction of the first mobile body in the first time slot and that the second mobile body is permitted to move within the exclusive area in a travel direction identical to the travel direction of the first mobile body in the first time slot,
the method further comprises
a step of outputting, after setting the exclusive area of the first mobile body, to the first mobile body, a command to permit movement within the exclusive area in the first time slot,
when the second mobile body moves in the exclusive area in the same direction of travel as the first mobile body, outputting a command to allow movement to the second mobile body, and
when the second mobile body moves in the exclusive area in a direction of travel different from the first mobile body, not outputting a command to allow movement to the second mobile body.

2. The information processing method according to claim 1, wherein in the step of setting, the second position is set based on a speed of the first mobile body.

3. The information processing method according to claim 1, wherein in the step of setting, in a case where, on a route on the travel direction side, the second position is positioned between a first branch position at which the route on the travel direction side is branched to another route and a second branch position at which the route on the travel direction side is branched to another route next to the first branch position, an area from the first position to the second branch position is set as the exclusive area.

4. The information processing method according to claim 1, wherein the exclusive area is set in a manner that the second mobile body is not permitted to move along a route within a predetermined distance range from the exclusive area in the first time slot.

5. The information processing method according to claim 1, further comprising
a step of acquiring information on a first route on which the first mobile body is scheduled to move and a second route on which the second mobile body is scheduled to move, wherein
in the step of setting, in a case where a section between the first position and the second position overlaps an overlapping section in which the first route and the second route overlap, an area from the first position to an end position of the overlapping section on the travel direction side of the first mobile body is set as the exclusive area.

6. An information processing device, comprising:
a movement information acquisition unit configured to acquire movement information on a first mobile body including information on a first position through which the first mobile body is scheduled to pass in a first time slot and information on a travel direction of the first mobile body; and
a work setting unit configured to set, as an exclusive area in the first time slot, an area between the first position and a second position on a travel direction side of the first mobile body from the first position based on the movement information on the first mobile body, wherein
the exclusive area is set in a manner that a second mobile body other than the first mobile body is not permitted to move within the exclusive area in a travel direction different from the travel direction of the first mobile body in the first time slot and that the second mobile body is permitted to move within the exclusive area in a travel direction identical to the travel direction of the first mobile body in the first time slot,
the work setting unit outputs, after setting the exclusive area of the first mobile body, to the first mobile body, a command to permit movement within the exclusive area in the first time slot,
when the second mobile body moves in the exclusive area in the same direction of travel as the first mobile body, outputs a command to allow movement to the second mobile body, and
when the second mobile body moves in the exclusive area in a direction of travel different from the first mobile body, not output a command to allow movement to the second mobile body.

7. A non-transitory computer readable storage medium storing a program that causes a computer to execute:
a step of acquiring movement information on a first mobile body including information on a first position through which the first mobile body is scheduled to pass in a first time slot and information on a travel direction of the first mobile body; and
a step of setting, as an exclusive area in the first time slot, an area between the first position and a second position on a travel direction side of the first mobile body from the first position based on the movement information on the first mobile body, wherein
the exclusive area is set in a manner that a second mobile body other than the first mobile body is not permitted to move within the exclusive area in a travel direction different from the travel direction of the first mobile body in the first time slot and that the second mobile body is permitted to move within the exclusive area in a travel direction identical to the travel direction of the first mobile body in the first time slot, and
the program further causes the computer to execute:
a step of outputting, after setting the exclusive area of the first mobile body, to the first mobile body, a command to permit movement within the exclusive area in the first time slot,
when the second mobile body moves in the exclusive area in the same direction of travel as the first mobile body, outputting a command to allow movement to the second mobile body, and
when the second mobile body moves in the exclusive area in a direction of travel different from the first mobile body, not outputting a command to allow movement to the second mobile body.

* * * * *